United States Patent
Lee (10) Patent No.: US 10,977,817 B2
(45) Date of Patent: Apr. 13, 2021

(54) IMAGE DEVICE CAPABLE OF PROCESSING IMAGES WITH DEPTH INFORMATION

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 144 days.

(21) Appl. No.: 15/942,367

(22) Filed: Mar. 30, 2018

(65) Prior Publication Data

US 2018/0288397 A1 Oct. 4, 2018

Related U.S. Application Data

(60) Provisional application No. 62/479,331, filed on Mar. 31, 2017.

(51) Int. Cl.
| | |
|---|---|
| *G06T 7/593* | (2017.01) |
| *H04N 13/204* | (2018.01) |
| *H04N 13/282* | (2018.01) |
| *H04N 5/232* | (2006.01) |
| *H04N 13/25* | (2018.01) |

(Continued)

(52) U.S. Cl.
CPC .............. *G06T 7/596* (2017.01); *G06T 3/40* (2013.01); *G06T 5/006* (2013.01); *G06T 5/50* (2013.01); *G06T 7/593* (2017.01); *H04N 5/23238* (2013.01); *H04N 13/111* (2018.05); *H04N 13/204* (2018.05); *H04N 13/239* (2018.05); *H04N 13/25* (2018.05); *H04N 13/254* (2018.05); *H04N 13/282* (2018.05); *H04N 13/296* (2018.05); *G06T 2207/10028* (2013.01); *G06T 2207/20221* (2013.01);

(Continued)

(58) Field of Classification Search
CPC ......... G06T 7/596; G06T 7/593; G06T 5/006; G06T 5/50; G06T 3/40; H04N 13/239; H04N 13/296; H04N 13/25; H04N 5/23238; H04N 13/282; H04N 13/204
See application file for complete search history.

(56) References Cited

U.S. PATENT DOCUMENTS

| | | | | | |
|---|---|---|---|---|---|
| 6,141,145 | A | * | 10/2000 | Nalwa | G03B 17/17 |
| | | | | | 359/403 |
| 2011/0096136 | A1 | * | 4/2011 | Liu | H04N 7/144 |
| | | | | | 348/14.07 |

(Continued)

FOREIGN PATENT DOCUMENTS

| | | |
|---|---|---|
| CN | 101014123 A | 8/2007 |
| CN | 102932657 A | 2/2013 |
| TW | 201618531 A | 5/2016 |

*Primary Examiner* — Mohammed S Rahaman
(74) *Attorney, Agent, or Firm* — Winston Hsu (57) ABSTRACT

An image device includes a first image capture module, a second image capture module, and an image processor. The first image capture module has a first field of view, and the second image capture module has a second field of view different from the first field of view. The image processor is coupled to the first image capture module and the second image capture module. The image processor sets a virtual optical center according to the first image capture module, the second image capture module, and a target visual scope, and generates a display image corresponding to the virtual optical center.

3 Claims, 7 Drawing Sheets

(51) Int. Cl.
    *H04N 13/296*  (2018.01)
    *H04N 13/239*  (2018.01)
    *H04N 13/254*  (2018.01)
    *H04N 13/111*  (2018.01)
    *G06T 3/40*    (2006.01)
    *G06T 5/50*    (2006.01)
    *G06T 5/00*    (2006.01)
    *H04N 13/00*   (2018.01)

(52) U.S. Cl.
    CPC ............... *G06T 2207/20228* (2013.01); *G06T 2219/2016* (2013.01); *H04N 2013/0081* (2013.01)

(56) References Cited

U.S. PATENT DOCUMENTS

| | | | | |
|---|---|---|---|---|
| 2012/0287222 A1* | 11/2012 | Liu | ............. | H04N 5/2625 348/14.07 |
| 2014/0063187 A1* | 3/2014 | Tsukagoshi | .......... | H04N 21/816 348/43 |
| 2014/0125774 A1* | 5/2014 | Lee | ............. | H04N 13/20 348/47 |

* cited by examiner

IMAGE DEVICE CAPABLE OF PROCESSING IMAGES WITH DEPTH INFORMATION

CROSS REFERENCE TO RELATED APPLICATIONS

This non-provisional application claims priority of US provisional application U.S. 62/479,331, filed on Mar. 31, 2017, included herein by reference in its entirety.

BACKGROUND OF THE INVENTION

1. Field of the Invention

This invention is related to an image device, and more particularly, an image device capable of processing images with depth information.

2. Description of the Prior Art

As the demand for image quality grows, some of the electronic devices are fitted with dual cameras to capture images. For example, according to different requirements in different usage scenarios, the electronic device can capture images with wide-angle lens for a broadened view and capture images with telephoto lens for a dedicated view with higher resolution. For example, the user may use the wide-angel lens to locate the objects to be captured first, and then adjust the focal length gradually for capturing the desired image of the objects. If the focal length required by the user is beyond the capability of the wide-angle lens, then the electronic device may shift from the wide-angle lens to the telephoto lens to capture the desired image.

However, the wide-angle lens and the telephoto lens are disposed at different positions, so an obvious view change will occur during the zooming transition, causing discontinuity of images. Therefore, the capture process is difficult to control, and the user can be disturbed. Also, the greater the distance between the two lens or the closer the objects locates, the more obvious the discontinuity become, causing limitations and difficulties to the design of electronic devices.

SUMMARY OF THE INVENTION

One embodiment of the present invention discloses an image device. The image device includes a first image capture module, a second image capture module, and an image processor.

The first image capture module has a first field of view, and the second image capture module has a second field of view different from the first field of view. The image processor is coupled to the first image capture module and the second image capture module. The image processor sets a virtual optical center according to the first image capture module, the second image capture module, and a target visual scope, and generates a display image corresponding to the virtual optical center.

Another embodiment of the present invention discloses an image device. The image device includes an image capture module, a structured light source, a depth processor, and an image processor.

The first image capture module has a field of view. The structured light source projects a structured light intermittently. The depth processor is coupled to the first image capture module and the structured light source. The depth processor generates depth information according to at least a depth image capturing the structured light and captured by the first image capture module during the structured light source projecting the structured light. The image processor is coupled to the first image capture module and the second image capture module. The image processor generates a display image for the image device according to the depth information and at least one image captured by the first image capture module during a period when the structured light source stops projecting the structured light.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
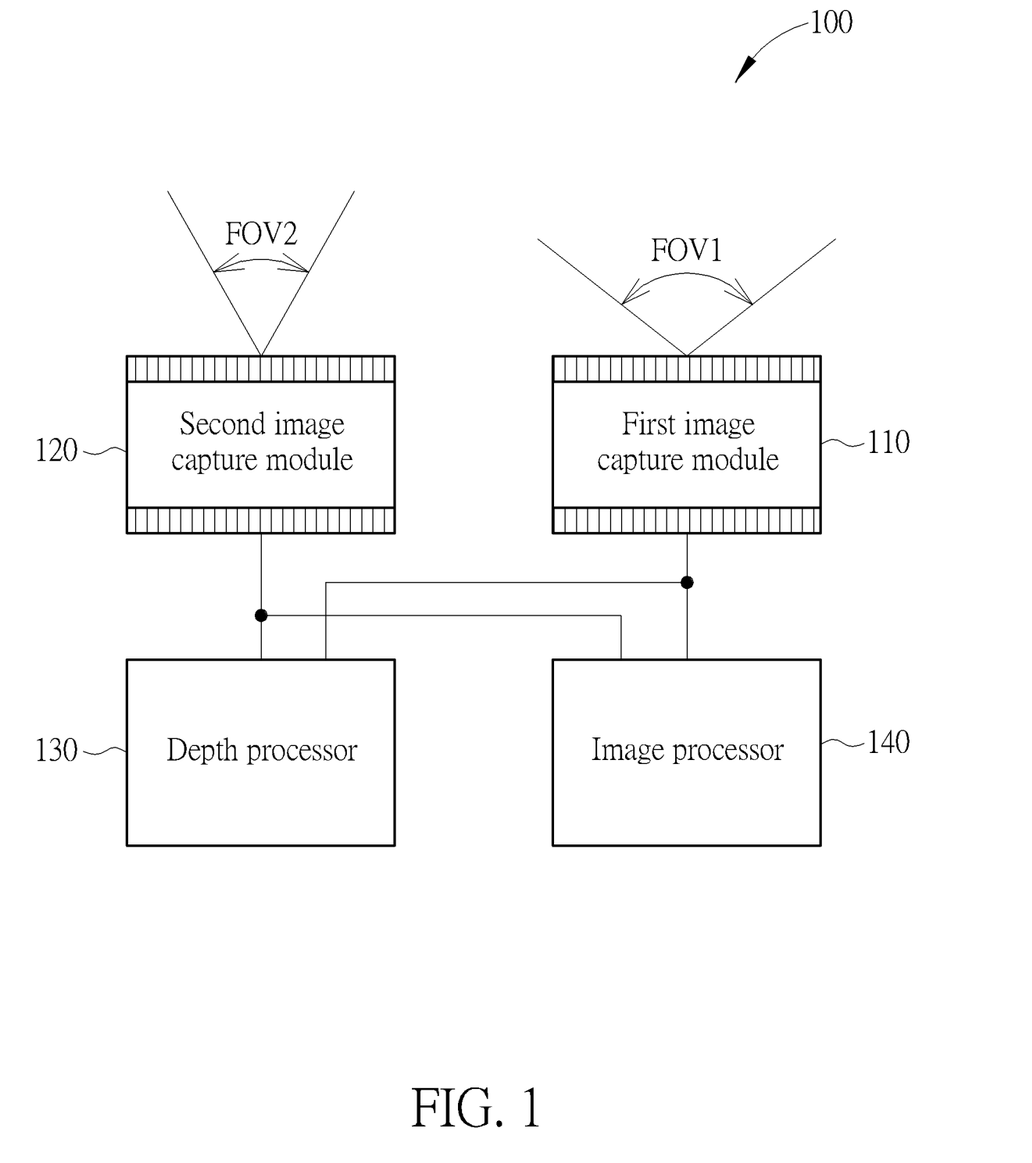
FIG. 1 shows an image device according to one embodiment of the present invention.

FIG. 1 shows an image device 100 according to one embodiment of the present invention. The image device 100 includes a first image capture module 110, a second image capture module 120, a depth processor 130, and an image processor 140. The image processor 140 is coupled to the first image capture module 110 and the second image capture module 120.

The first image capture module 110 has a first field of view (FOV) FOV1, and the second image capture module 120 has a second field of view FOV2 different from the first field of view FOV1.

The depth processor 130 can generate depth information according to a plurality of images captured by the first image capture module 110 and the second image capture module 120. That is, since the first image capture module 110 and the second image capture module 120 can capture objects from different positions, the derived images can be deemed as images observed by a right eye and a left eye required by the binocular vision. Therefore, according to the intrinsic and extrinsic parameters of the first image capture module 110 and the second image capture module 120, such as the distance between the two image capture modules, that is, the length of the baseline, and parameters of the focal lengths, the depth processor 130 can derive the distances from the captured object to the first image capture module 110 and the second image capture module 120 with the triangulation, and further derive the depth information.

In addition, since the first image capture module 110 and the second image capture module 120 have different fields of view, the image device 100 can perform a calibration function first to ensure that the images can be captured properly for the processing of the depth processor 130. For example, the image device 100 can normalize the focal lengths of the first image capture module 110 and the second image capture module 120 so the units represented by the image pixel would have the same definition for the two image capture modules. To generate effective depth information, the image capture module having a greater field of view may follow the specification of the image capture module having a smaller field of view so the images captured by the two image capture modules would have the similar widths when restoring the images to pixel base. That is, the image captured by the image capture module having the greater field of view may be cropped. Consequently, the content of the images captured by the first image capture module 110 and the second image capture module 120 would be more relevant, and the objects in these images would have similar sizes, helping the depth processor 130 to compare the object features and generate the depth information.

However, since the first image capture module 110 and the second image capture module 120 are actually disposed separated with a distance, there must be some differences between the images captured by these two. To compare the objects in the two images captured by the first image capture module 110 and the second image capture module 120 thoroughly, when cropping the image captured by the image capture module having the greater field of view, some portion of the image close to the image capture module having the smaller field of view may be preserved. That is, the image captured by the image capture module having greater field of view may have greater width for covering the objects captured by the image capture module having the smaller field of view, enriching the depth information.

According to the depth information generated by the depth processor 130, the image processor 140 can set the virtual optical center of the image device 100 according to the target visual scope, the first image capture module 110, and the second image capture module 120. For example, the user may adjust the viewing direction and the focal length according to the position and the distance of the object to be captured to decide the target visual scope. That is, the target visual scope, or the scope that the user wants the image to cover, would be decided by the target viewing direction and the target focal length together. Since the target visual scope requested by the user may be within the first field of view FOV1 of the first image capture module 110, within the second field of view FOV2 of the second image capture module 120, or within both of the fields of view FOV1 and FOV2, the image processor 140 can set a proper virtual optical center for providing the image with proper viewpoint according to the positions of the optical center of the first image capture module 110 and the second image capture module 120, and the first field of view FOV1 and the second field of view FOV2 supported by the first image capture module 110 and the second image capture module 120. In some embodiments, the virtual optical center can be set between the optical center of the first image capture module 110 and optical center of the second image capture module 120. For example, the virtual optical center can be set on the line connected between the first image capture module 110 and the second image capture module 120. Also, the image processor 140 can also set the virtual optical center right on the optical center of the first image capture module 110 (or the optical center of the second image capture module 120), and in this case, the image device 100 can generate the display image by simply using the image captured by the first image capture module 110 (or the optical center of the second image capture module 120).

Consequently, if the virtual optical center is shifting from the first image capture module 110 to the second image capture module 120 or vice versa, then image processor 140 would be able to generate images corresponding to the virtual optical centers during the shifting process, preventing the unsmooth transition caused by sudden viewpoint changes during the process of switching the dominant image capture module.

In some embodiments, the change of the target visual scope may include the change of the target viewing direction and the change of the target focal length (that is, the change of the size of object to be captured). For example, when the user requests to change the target focal length, the image device 100 can perform the zooming function. In this case, if the target focal length is beyond the focal length supported by the first image capture module 110 and the second image capture module 120 is able to provide a relative longer focal length, then the image device 100 can change from the first image capture module 110 to the second image capture module 120 to provide the display image. During the transition, the virtual optical center shifts from the first image capture module 110 to the second image capture module 120 gradually.

Figure 2:
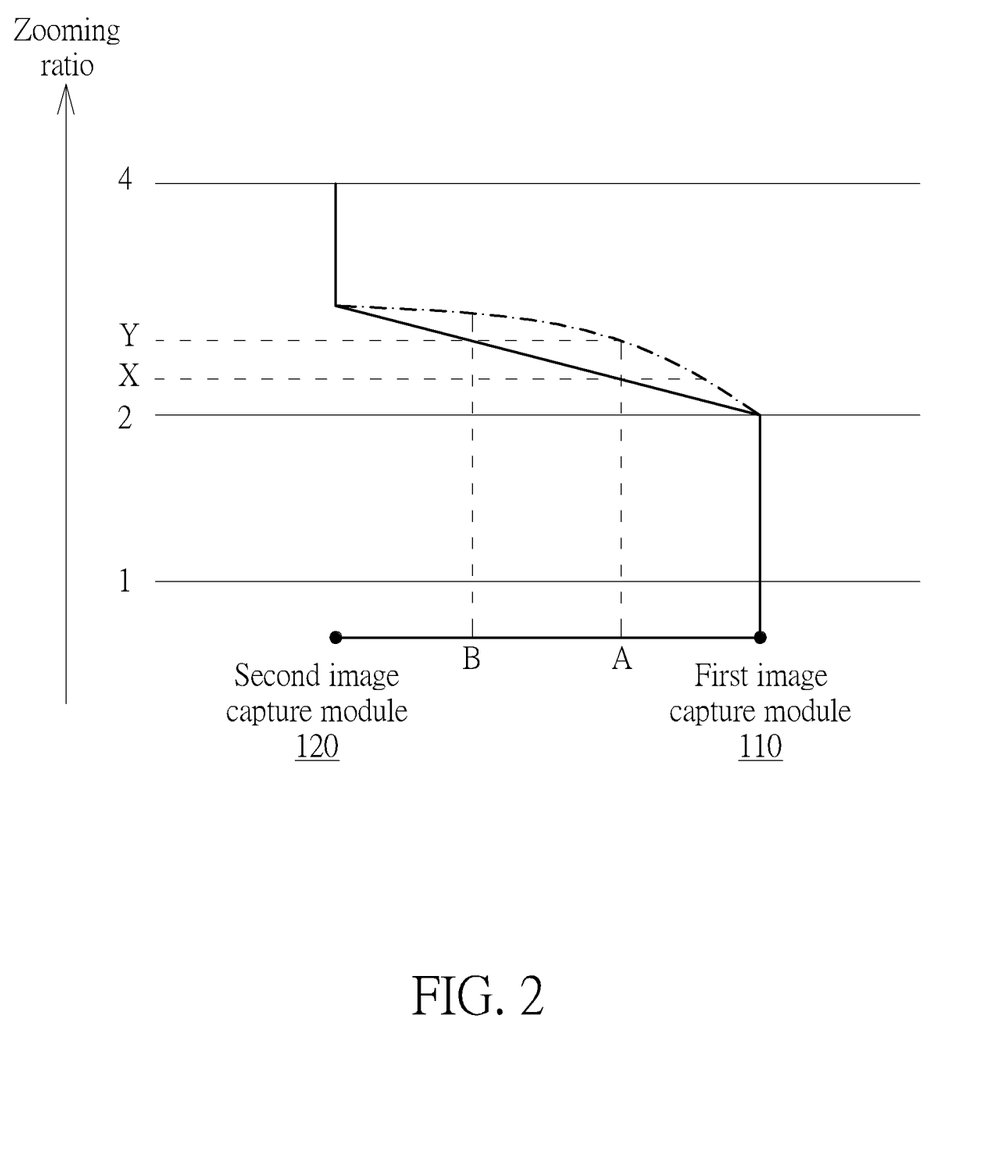
FIG. 2 shows a relation between the virtual optical center and the zooming ratio of the target focal length according to one embodiment of the present invention.

FIG. 2 shows a relation between the virtual optical center and the zooming ratio of the target focal length according to one embodiment of the present invention. In FIG. 2, the first field of view FOV1 can be greater than the second field of view FOV2. That is, the first image capture module 110 can have a relative wide-angle lens while the second image capture module 120 can have a relative telephoto lens.

In this case, when the user wants to adjust the focal length to zoom in, the image device 100 can have the image processor 140 perform the zooming function. When performing the zooming function, the image processor 140 can use the first image capture module 110 for providing the image and change to use the second image capture module 120 for providing the image when the user keeps adjusting the focal length and the required focal length becomes beyond the capability of the first image capture module 110.

During the transition, the image device 100 would change the optical center from the first image capture module 110 to the second image capture module 120. To have a smoother transition, the image processor 140 can set the virtual optical centers between the first image capture module 110 and the second image capture module 120 during the transition according to the current target focal lengths. For example, in FIG. 2, when the zooming ratio of the target focal length reaches X, the image processor 140 may set the virtual optical center at point A, and when the zooming ratio of the target focal length reaches Y, the image processor 140 may set the virtual optical center at point B.

In the present embodiment, the image processor 140 can decide the position of the virtual optical center by linear interpolation according to the target focal length. However, this is not to limit the present invention. In other embodiments, the image processor 140 can also decide the position of the virtual optical center with a nonlinear manner. In other words, the image processor 140 can decide the relation between of the virtual optical center and the focal target length according to the system requirements. For example, the relation between the target focal length and the virtual optical center can also be shown as the dot-and-dash line in FIG. 2. In this case, the virtual optical center will move slower in the beginning, for example the virtual optical center would be at the point A when the zooming ratio of the focal length reaches Y, and the virtual optical center will move quicker at the end of transition. Consequently, if the adjustment of the focal length were rather small, then it would be even more difficult for the user to notice the change of the virtual optical center.

After the image processor 140 sets the virtual optical center to the point A or B, the image processor 140 can further generate the display image by processing at least one of the first image captured by the first image capture module 110 and the second image captured by the second image capture module 120 according to the depth information derived by the depth processor 130. That is, the display image generated by the processor 140 would be similar to the image captured by an image capture module with its optical center and the point A or B. In some embodiments of the present invention, based on the two dimensional images and the correspondent depth information, the image processor 140 can combine the first image and the second image to generate the display image corresponding to the virtual optical center according to the depth image based rendering (DIBR) algorithm. The aforementioned depth information can be derived by the calculation of the depth processor 130, or can be predicted without using the depth processor 130. In addition, in some other embodiments, the image processor 140 can process three dimensional data. In this case, the image processor 140 can transform the captured two dimensional images and the correspondent depth information into a three dimensional format, such as a three dimensional point cloud, and generate the display image according to the three dimensional point cloud from a viewpoint at the virtual optical center.

In the embodiment shown in FIG. 2, the image device 100 may start to shift its optical center to the second image capture module 120 gradually when the zooming ratio of the focal length of the first image capture module becomes 2. However, in some other embodiments, the image device 100 may choose other zooming ratios as the start point for shifting its optical center according to the practical hardware specification.

By setting the virtual optical center to provide display images with gradually shifting viewpoints, the image device 100 can provide smooth transitioning images during the zooming process, and can prevent the parallax (disparity) in the image transition caused by sudden changes of the optical centers. In addition, since the image device 100 can generate the display image corresponding to the virtual optical center according the depth information, it would not be necessary to strictly limit the distance between the first image capture module 110 and the second image capture module 120, resulting greater flexibility in the design and the manufacture of the image device 100.

In some embodiments of the present invention, the image device 100 can adopt a standard image compression algorithm, such as the compression algorithm defined by the Joint Photographic Experts Group (JPEG), to compress the first image captured by the first image capture module to generate a compressed image file. In this case, the other data required, such as the depth information and the intrinsic and extrinsic parameters of the first image capture module 110 and the second image capture module 120 can be stored in the user defined header of the compressed image file. Therefore, the other image device supporting the same functions can derive the depth information and the internal and external parameters of the image capture modules from the compressed filed, and can generate the display image with the corresponding viewpoint. However, if an image device receives the compressed file while the image device does not support this function, then the image device can still at least decompress the compressed file to restore the first image.

In the aforementioned embodiments, when the target focal length is changed, the image device 100 can perform the zooming function and set the virtual optical center during the transition process of the first image capture module 110 and the second image capture module 120. However, this is not to limit the present invention. In some other embodiments, when the target viewing angle is changed, and the image capture module for providing the display image has to be changed accordingly, the image device 100 can also set the virtual optical center so the user will not notice the sudden viewpoint change in the transition images. In addition, according to the requirement of the target visual scope, and the viewing angles and the focal lengths supported by the first image capture module 110 and the second image capture module 120 practically, the image device 100 may also present the corresponding images with different ways.

Figure 3:
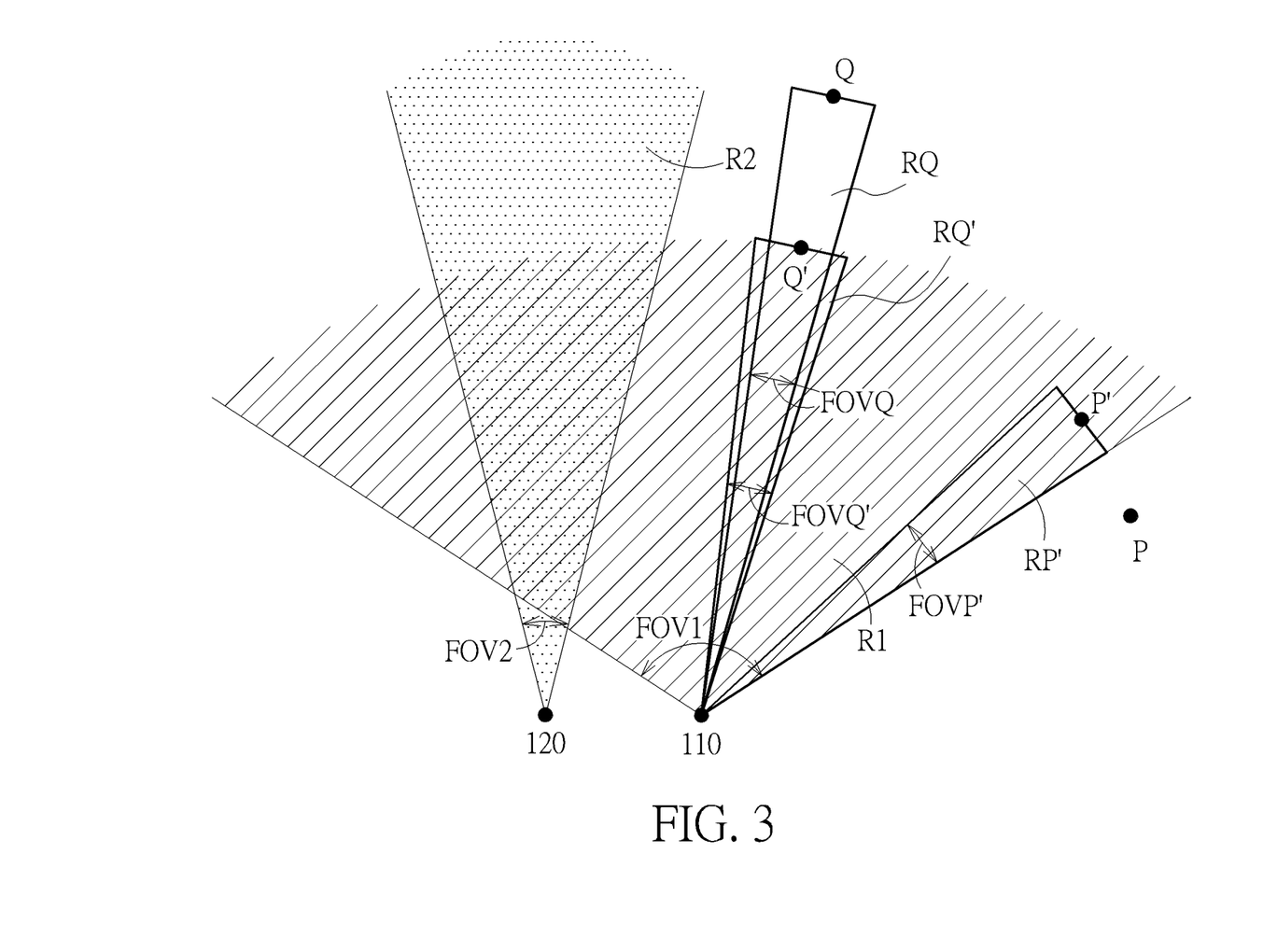
FIGS. 3 and 4 show the viewing scopes supported by the first image capture module and the second image capture module in FIG. 1.
Figure 4:
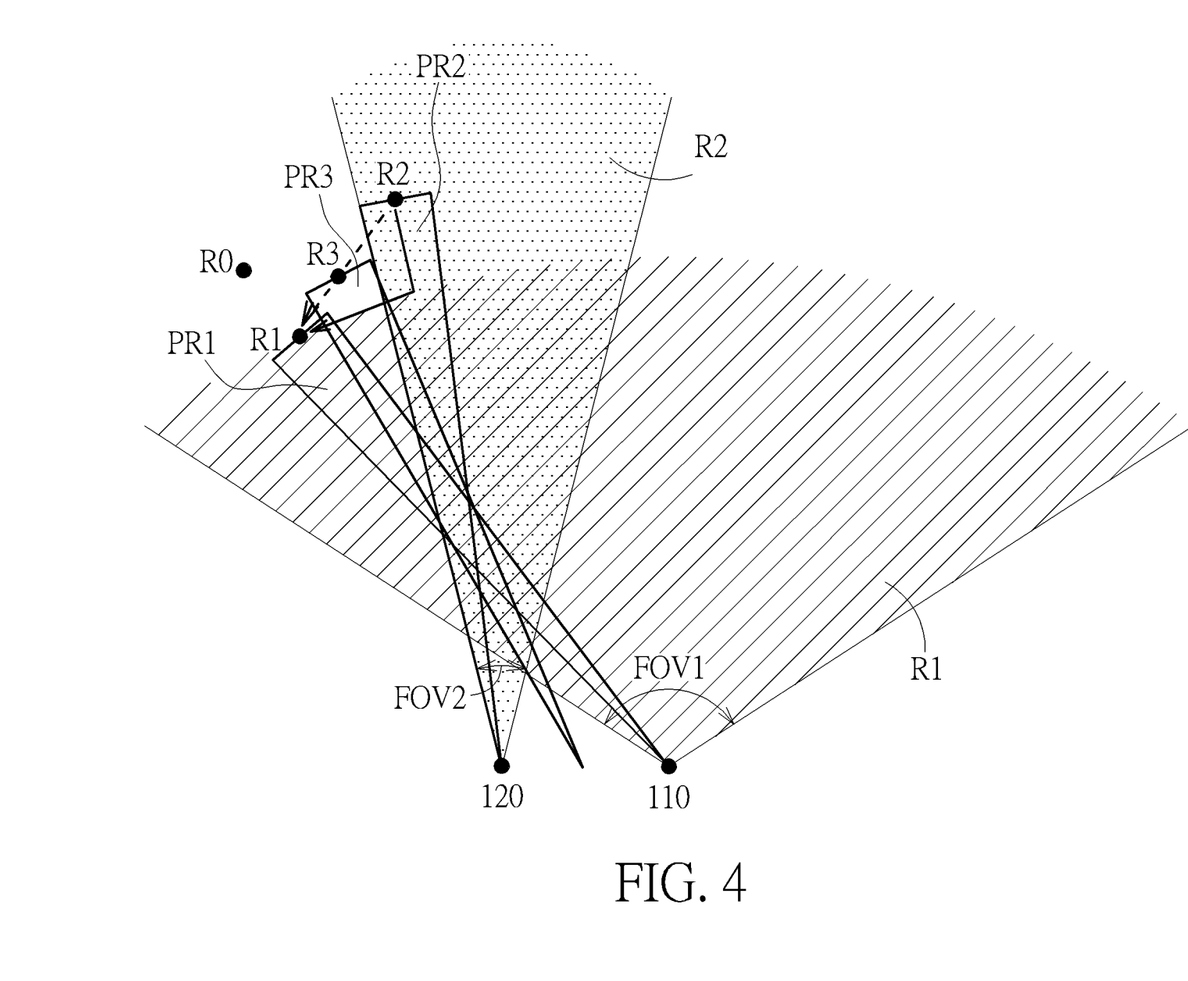

FIGS. 3 and 4 show the viewing scopes supported by the first image capture module 110 and the second image capture module 120. In FIGS. 3 and 4, the region R1 with stripes represents the viewing scope supported by the first image capture module 110, and the region R2 with dots represents the viewing scope supported by the second image capture module 120. In the present embodiment, since the first image capture module 110 uses a relative wide-angle lens, the region R1 in FIG. 3 has a wider distribution. Also, in FIGS. 3 and 4, objects disposed farther away from the image capture module would require greater focal length for the image capture module to capture a clear image.

Since both the first image capture module 110 and the second image capture module 120 have their physical limitations, the image device 100 is not able to provide images in any directions with any focal lengths. In some embodiments of the present invention, when the target viewing direction requested by the user is beyond the first field view FOV1 supported by the first image capture module 110, then the image device 100 may continue presenting a previous image, that is, continue presenting the image that is most close to the requirement of the user that the first image capture module 110 can possibly capture. For example, if the user wants the image device 100 to present the image with point P at the center as shown in FIG. 3, then the image processor 140 can use the first image capture module 110 to capture the corresponding image with the virtual field of view FOVP' within the supported region R1 and the point P' being at the center without further processing. That is, the first image capture module 110 will capture the image within the projection region RP' while the point P' is at the center of the projection plane of the projection region RP'.

In addition, when the target visual scope is beyond a greatest focal length of the first image capture module 110 and beyond the second field of view FOV2 supported by the second image capture module 120, then the image device 100 can display a previously presented image, that is, the image device 100 will keep presenting the image closest to the requirement of the user that the image device 100 can possibly capture with the greatest focal length. Alternatively, the image device 100 may also present a vague enlarged image first (for example, generated by digital zooming), and then returns to display the image with the greatest focal length.

For example, when the user wants the image device 100 to present the image with the point Q at the center, the image device 100 can keep presenting the image closest to the requirement of the user that the image device 100 can possibly capture, that is, the image within the projection region RQ' and with point Q' at the center captured by the first image capture module 110 with the virtual field of view FOVQ as shown in FIG. 3. Or, the image device 100 can first present the vague enlarged image within the projection region RQ and with point Q at the center captured by the first image capture module with the virtual field of view FOVQ, and then gradually switching to the image within the projection RQ' and with the point Q' at the center, notifying the user of the boundary limitation of the image device 100. In FIG. 3, the projection regions RQ' and RQ are the actual projection scopes of the first image capture module 110. Since the images finally presented should have the same sizes, the bottom edges of the projection regions RQ' and RQ are the same as shown in FIG. 3. That is, the projection planes have the same widths, and the virtual field of view FOVQ would be smaller than the virtual field of view FOVQ'.

In addition, if the target focal length requested by the user is beyond the greatest focal length supported by the first image capture module 110 while the target viewing direction is within the second field of view FOV2 of the second image capture module 120, then the image device 100 can perform the zooming function as shown in FIG. 2 to gradually switch from the first image capture module 110 to the second image capture module 120 for providing the display image. Also, during the switching process, the virtual optical center is also moved accordingly, making the transition even smoother.

In addition, if the target viewing direction requested by the user is beyond the second field of view FOV2 supported by the second image capture module 120 and the target focal length is also beyond the greatest focal length supported by the first image capture module 110, then the image device 100 can gradually shift to the first image capture module 110 to provide an image covering the target visual scope with short focal length. For example, if the user wants the image device 100 to present the image with point R0 at the center as shown in FIG. 4, then the image device 100 may present the image within the projection region RR1 with the point R1 at the center. In some embodiments, the image device 100 can present the image within the projection region RR2 with the point R2 at the center captured by the second image capture module 120, shorten the focal length of the second image capture module 120 to zoom out, and then switch to the first image capture module 110 and adjust the viewing direction gradually while providing the corresponding images, that is, the solid line shown FIG. 4. Or, during the switching process, the image device 100 can set the virtual optical center between the first image capture module 110 and the second image capture module 120, and combine the images captured by the first image capture module 110 and the second image capture module 120 to generate the image corresponding to the virtual optical center, which is within the projection region RR3 and with the point R3 at the image center. With the similar approach, the image device 100 can finally present the image with the point R1 at the center along the dotted line shown in FIG. 4.

In other words, when the target visual scope requested by the user is changed, for example, either the target viewing direction or the target focal length is changed, the image device 100 can set the virtual optical center according to the requirement. Therefore, during the process for switching the image capture modules, the feeling of sudden change of the viewpoints can be prevented.

In some embodiments, the depth processor 130 can be a field programmable gate array (FPGA), an application-specific integrated circuit (ASIC), or a software module having the aforementioned functions. In addition, the image processor 140 can be a field programmable gate array, an application-specific integrated circuit, or a software module having the aforementioned functions. Also, in some embodiments, the depth processor 130 and the image processor 140 can be integrated into one processor, and this processor can be a field programmable gate array, an application-specific integrated circuit, or a software module having the functions of the depth processor 130 and the functions of the image processor 140.

Figure 5:
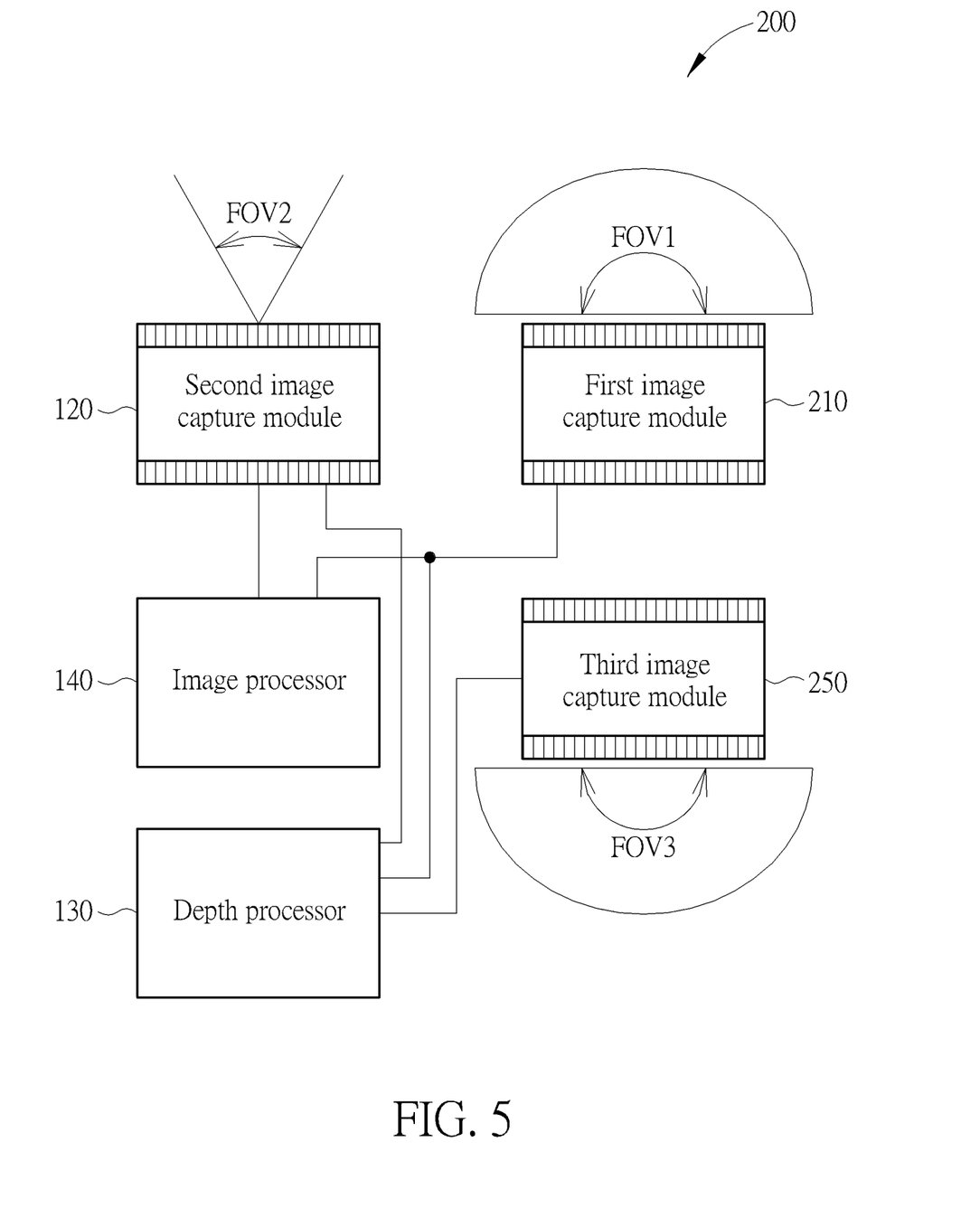
FIG. 5 shows an image device according to one embodiment of the present invention.

FIG. 5 shows an image device 200 according to one embodiment of the present invention. The image devices 100 and 200 have similar structures and can be operated with similar principles. However, the first image capture module 210 of the image device 200 has an fisheye lens, and the image device 200 can further include a third image capture module 250.

The third image capture module 250 has a third field of view FOV3 to complement the first field of view FOV1. That is, the first image capture module 210 and the third image capture module 250 can be disposed at the two opposite sides of the image device 200, and the third image capture module 250 can also have a fisheye lens, so the two image capture modules can provide a 360° panoramic image together. Although the fisheye lens and the wide-angle lens may have different projection schemes, these two can still be transformed from one to another through mathematic approach, such the warping transform, to present the desired image. For example, when using the fisheye lens, if the required visual scope is rather wide, then the resolution near the borders of the image may become lower when the viewing scope is projected onto a plane. Moreover, the supported viewing angle cannot reach to 180°. In this case, the fisheye projection formula may be used to present the image. In some embodiments, the image device 200 can transform between the planar projection and the fisheye projection according to the required visual scope, or the image forming radius calculated by the two projection formulas may be combined with proper weighting, making the transition smoother. In addition, the third image capture module 250 is not limited to have a fisheye lens. In some other embodiments, the third image capture module 250 may have different types of lenses. Also, the image device 200 may include two or more third image capture modules 250 having different capturing angles, and the third image capture modules 250 can generate the 360° panoramic image together with the first image capture module 210.

Figure 6:
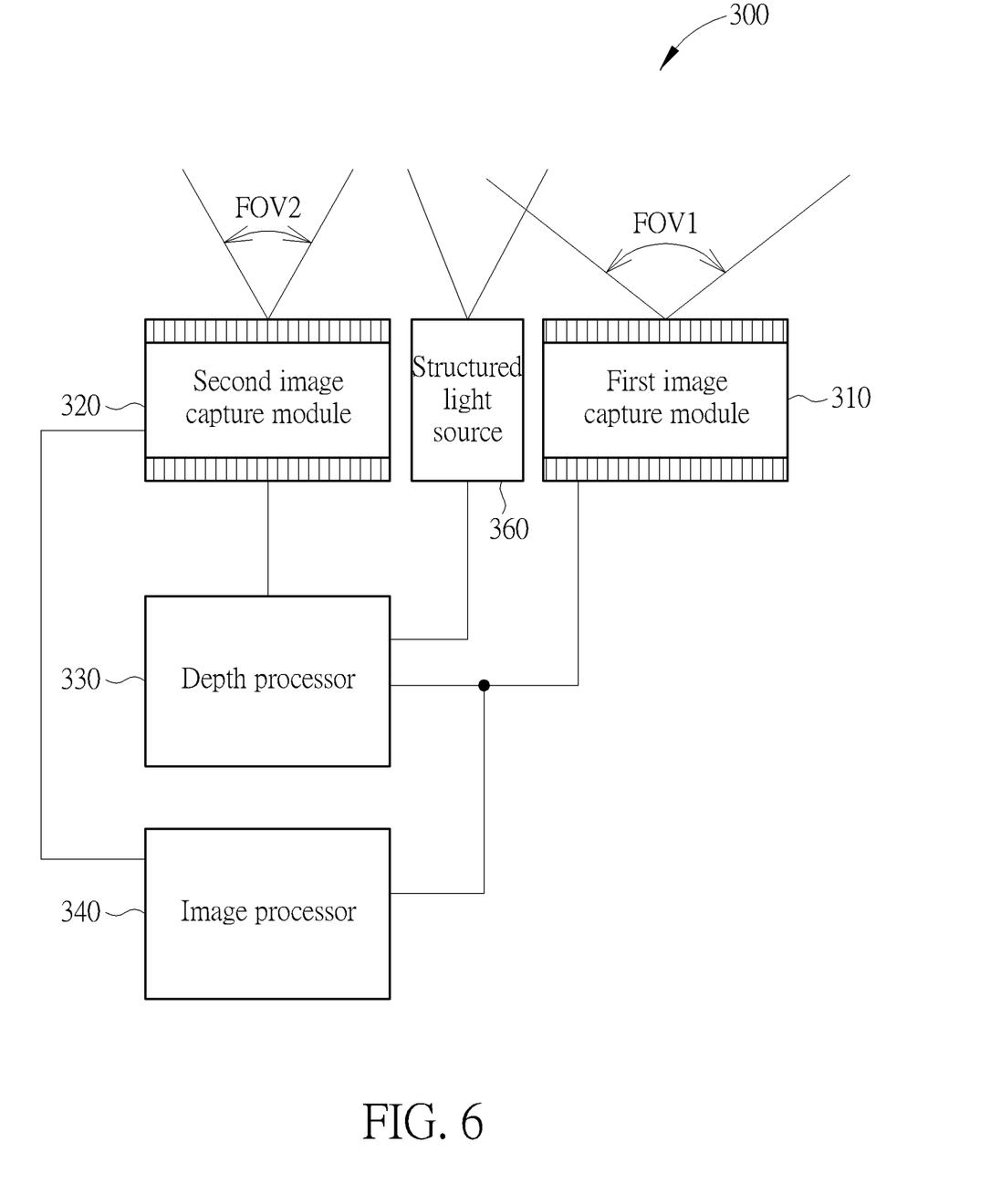
FIG. 6 shows an image device according to one embodiment of the present invention.

FIG. 6 shows an image device 300 according to one embodiment of the present invention. The image device 300 includes a first image capture module 310, a depth processor 330, an image processor 340, and a structured light source 360. The depth processor 330 is coupled to the first image capture module 310 and the structured light source 360. The image processor 340 is coupled to the first image capture module 310, the structured light source 360, and the depth processor 330.

The structured light source 360 can project the structured light with specific features. After the structured light emits to the objects, the structured light would be reflected with different patterns according to the position of the objects. Therefore, the depth processor 330 can analyze the features of the structured light captured by the first image capture module 310 to generate the depth information. Generally, to prevent the external environment from affecting the captured image, the structured light can be infrared light, and can be the infrared light with wavelength which is weaker in the sunlight. For example, the infrared with wavelength of 940 nm may be used to reduce the disturbance caused by the sunlight.

In some embodiments, the first image capture module 310 can use the existing red light sensors, blue light sensors, and green light sensors to sense the structured light. However, in this case, when capturing images, the sensed values caused by the structured light would have to be deducted to restore the real values of the red lights, the blue lights, and the green light. However, this is not to limit the present invention. In some other embodiments, the first image capture module 310 can include infrared light sensors to sense the structured light.

Figure 7:
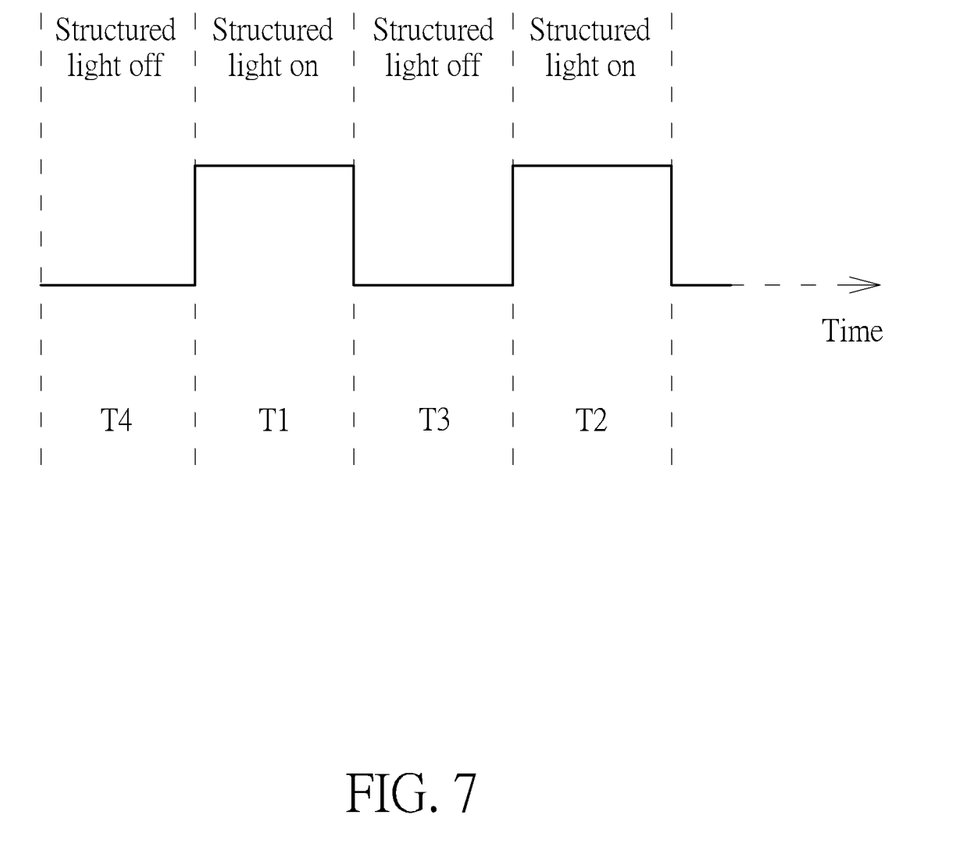
FIG. 7 shows the projection timing of the structured light source in FIG. 6.

However, even by using the infrared sensors to sense the structured light, the appearance of the structured light can still cause the saturation of the red light sensors, the blue light sensors, and the green light sensors, distorting the colors in the image. To address this issue, the image device 300 can have the structured light source 360 project the structured light intermittently. FIG. 7 shows the projection timing of the structured light source 360 according to one embodiment of the present invention.

In FIG. 7, the structured light source 360 can project the structured light in a first period of time T1 and a second period of time T2, and stop projecting the structured light in a third period of time T3 between the first period of time T1 and the second period of time T2. Consequently, the depth processor 330 can generate the first depth information according to a first image with the structured light captured by the first image captured module 310 during the first period of time T1, and the image processor 340 can generate the display image for the image device 300 according to a third image captured by the first image captured module 310 during the third period of time T3 and the first depth information generated by the depth processor 330 without being disturbed by the structured light.

Since the first image and the third image are captured at different times, to ensure the depth information generated by the depth processor 330 can match with the content of the third image, the depth processor 330 can generate the a first depth information and a second depth information according to both the first image and the second image with the structured light captured during the first period of time T1 and the second period of time T2 respectively. That is, the processor 330 can generate the depth information corresponding to the third image captured during the third period of time T3 according to the first depth information and the second depth information by interpolation so that the depth information corresponding to the third image can be more accurate.

In addition, in some embodiments, when the variation between images is obvious, that is, when the images are dynamically changing, the first depth information and the third image may match inaccurately. In this case, the image device 300 can check if there is obvious difference between the first depth information and the second depth information to perform the motion detection. Also, when there's no motion detected, the image device 300 will match at least one of the first depth information and the second depth information with the third image.

Similarly, in some embodiments, the image device 300 can compare the third image with a fourth image captured by the first image capture module 310 during a fourth period of time T4 before the first period of time T1 for the motion detection. And, the image device 300 will match the first depth information with the third image or the fourth image when there's no motion detected.

In FIG. 6, the image device 300 can further include a second image capture module 320. The second image capture module 320 has a second field of view FOV2 different from the first field of view FOV1 of the first image capture module 310. In some embodiments, the depth processor 330 can generate the depth information according to the two images capturing the structured light and captured by the first image capture module 310 and the second image capture module 320 during the first period of time.

Furthermore, with the depth information generated by the depth processor 330, the image device 300 can set the virtual optical center during the process of switching image capture modules, and generate the image corresponding to the virtual optical center by combing the two images captured by the first image capture module 310 and the second image capture module 320 during the third period of time T3, which is similar to the zooming approach shown in FIG. 2. Consequently, the processor of switching image capture modules can be smoother, preventing the user from sensing the sudden change of viewpoint and improving the user experience.

In this case, the image device 300 can use the similar approach as the image device 100 for providing the corresponding image according to the target viewing direction and the target focal length requested by the user. Also, the images and the depth information can be stored in the same way as with the image device 100.

Also, the depth processor 330 is not limited to use the structured light source 360 to generate the depth information in the present invention. In some embodiments, the two image capture module 310 and 320 can help the depth processor 330 to generate the depth information by providing the right eye view and the left eye view required by the binocular vision. Therefore, the image device 300 may turn off the structured light source 360 when the ambient light is sufficient and the depth processor 330 would generate the depth information without the structured light in this case. However, when the ambient light is insufficient, the image device 300 would turn on the structured light source 360 to project structured light intermittently for enhancing the accuracy of the depth information generated by the depth processor 360.

In summary, the image device provided by the embodiments of the present invention can set the virtual optical center according to the target visual scope requested by the user and generate the image corresponding to the virtual optical center. Therefore, during the process of switching image capture modules, the image device is able to generate a series of images with viewpoints moving gradually, preventing the user from sensing the sudden change of viewpoints, simplifying the control of the capturing process, enhancing the user experience. In addition, since the image device of the present invention can use the depth information to generate the image corresponding to the virtual optical center, strict limitation on the distance between the two image capture modules would be unnecessary, allowing the design and the manufacturing of the image device to have greater flexibility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image device comprising:
a first image capture module having a first field of view;
a second image capture module having a second field of view different from the first field of view; and
an image processor coupled to the first image capture module and the second image capture module, and configured to set a virtual optical center according to the first image capture module, the second image capture module, and a target visual scope, and generate a display image corresponding to the virtual optical center;
wherein the first field of view is greater than the second field of view, and
when a target viewing direction received by the image device is beyond the first field of view, the image device continues to present a previous image.

2. An image device comprising:
a first image capture module having a first field of view;
a second image capture module having a second field of view different from the first field of view; and
an image processor coupled to the first image capture module and the second image capture module, and configured to set a virtual optical center according to the first image capture module, the second image capture module, and a target visual scope, and generate a display image corresponding to the virtual optical center;
wherein the first field of view is greater than the second field of view, and
when a target viewing direction received by the image device is beyond the second field of view, the image device gradually shifts to the first image capture module to provide a short focus image covering the target visual scope.

3. An image device comprising:
a first image capture module having a first field of view;
a second image capture module having a second field of view different from the first field of view; and
an image processor coupled to the first image capture module and the second image capture module, and configured to set a virtual optical center according to the first image capture module, the second image capture module, and a target visual scope, and generate a display image corresponding to the virtual optical center;
wherein the first field of view is greater than the second field of view, and
when the target visual scope is beyond a greatest focal length of the first image capture module and beyond the second field of view, the image device displays a vague enlarged image first, and then returns to display an image with the greatest focal length.

* * * * *